United States Patent
Kawabe

(10) Patent No.: US 10,658,004 B2
(45) Date of Patent: May 19, 2020

(54) MAGNETIC DISK DEVICE AND WRITE PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/294,009

(22) Filed: Mar. 6, 2019

(65) Prior Publication Data

US 2020/0090700 A1 Mar. 19, 2020

(30) Foreign Application Priority Data

Sep. 18, 2018 (JP) ................................ 2018-173567

(51) Int. Cl.
*G11B 5/596* (2006.01)
*G11B 21/08* (2006.01)
*G11B 5/012* (2006.01)

(52) U.S. Cl.
CPC .............. *G11B 21/08* (2013.01); *G11B 5/012* (2013.01)

(58) Field of Classification Search
CPC ..... G11B 27/36; G11B 5/00; G11B 20/10009; G11B 20/16; G11B 20/12; G11B 20/18; G11B 7/1263; G11B 27/24; G11B 20/1816; G11B 20/182; G11B 5/59633; G11B 5/59638
USPC .... 360/25, 31, 40, 48, 53; 369/47.53, 47.46, 369/53.1
See application file for complete search history.

(56) References Cited

U.S. PATENT DOCUMENTS

| | | | |
|---|---|---|---|
| 7,898,755 B2* | 3/2011 | Mochizuki | G11B 5/3967 360/31 |
| 8,045,281 B2 | 10/2011 | Cho et al. | |
| 8,300,350 B2 | 10/2012 | Kawabe | |
| 8,885,284 B2 | 11/2014 | Kashiwagi et al. | |
| 8,896,959 B1 | 11/2014 | Kashiwagi et al. | |
| 8,988,810 B1* | 3/2015 | Liew | G11B 20/10305 360/31 |
| 9,478,248 B2* | 10/2016 | Cordle | G11B 20/10388 |
| 9,728,215 B2 | 8/2017 | Kanamaru et al. | |

* cited by examiner

*Primary Examiner* — Nabil Z Hindi
(74) *Attorney, Agent, or Firm* — White & Case LLP

(57) ABSTRACT

According to one embodiment, a magnetic disk device includes a disk, a head configured to write data to the disk and read data from the disk, and a controller configured to control the head to write a first track based on a first error rate read immediately after writing a second track adjacent in a radial direction of the disk to the first track.

18 Claims, 12 Drawing Sheets

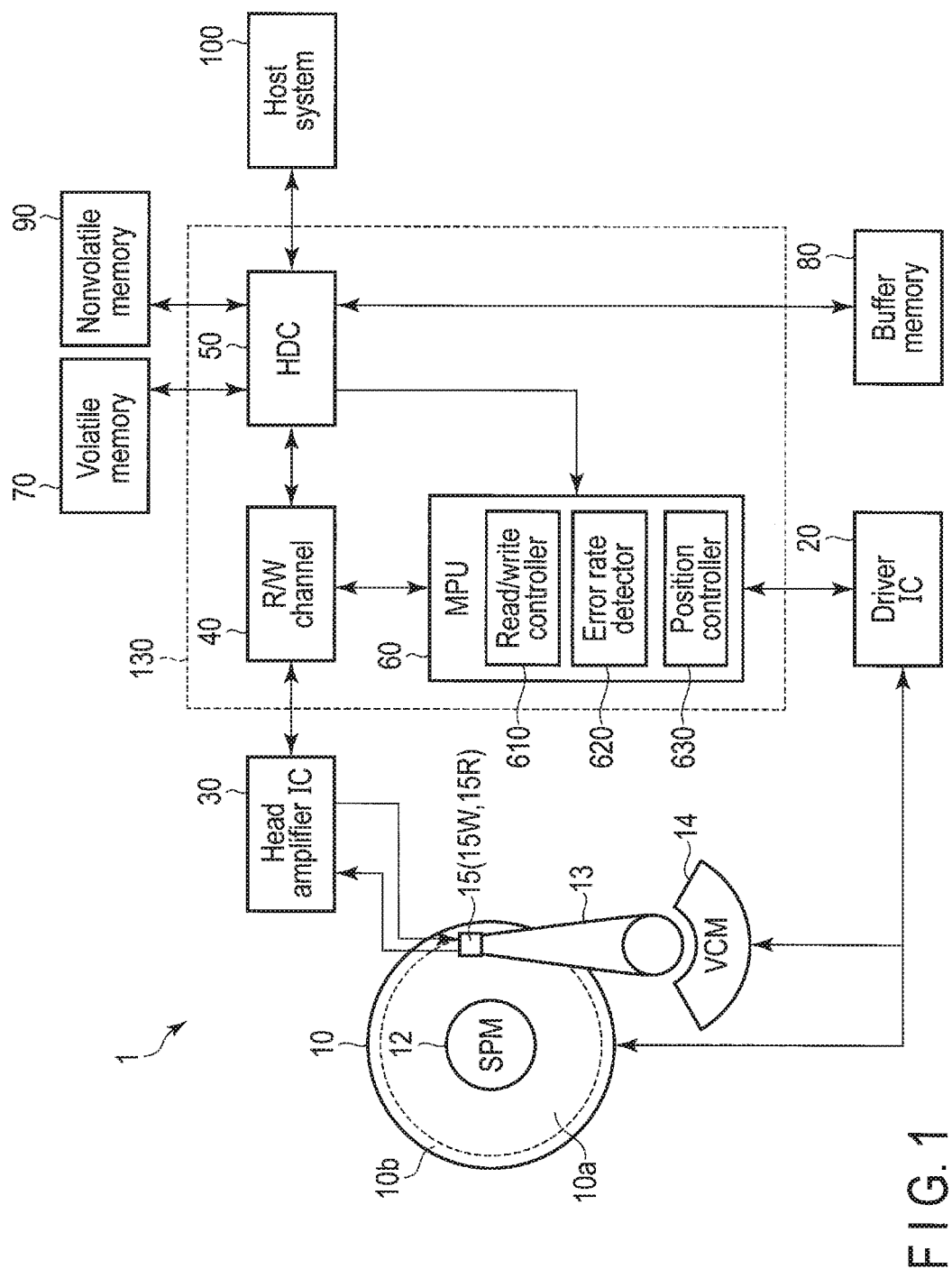
F I G. 1

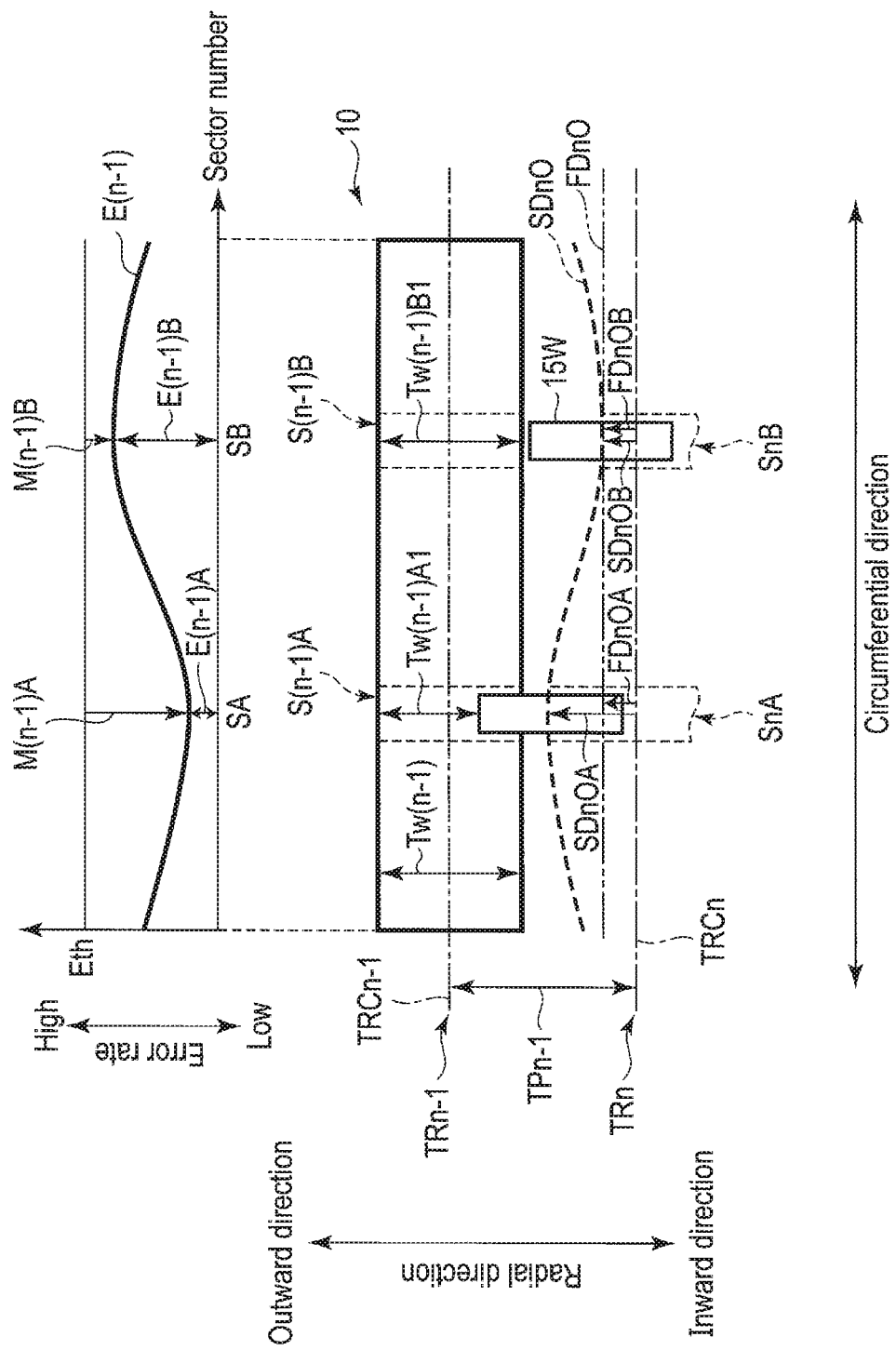
F I G. 2

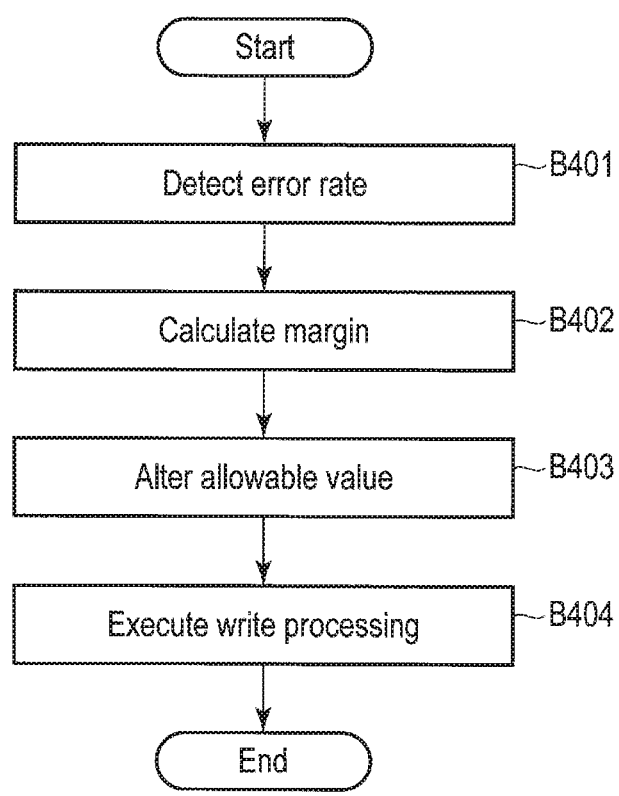
F I G. 4

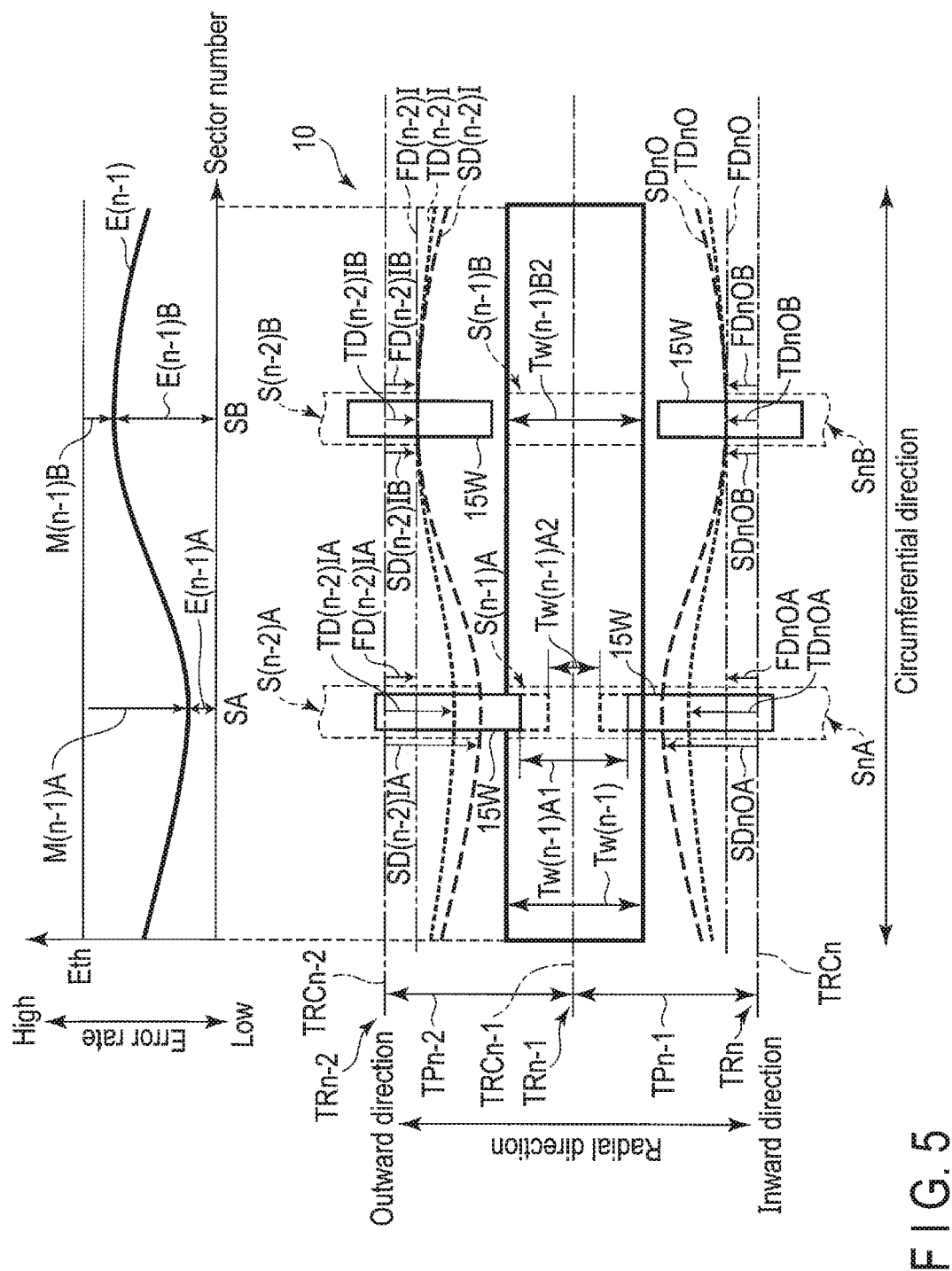
F I G. 5

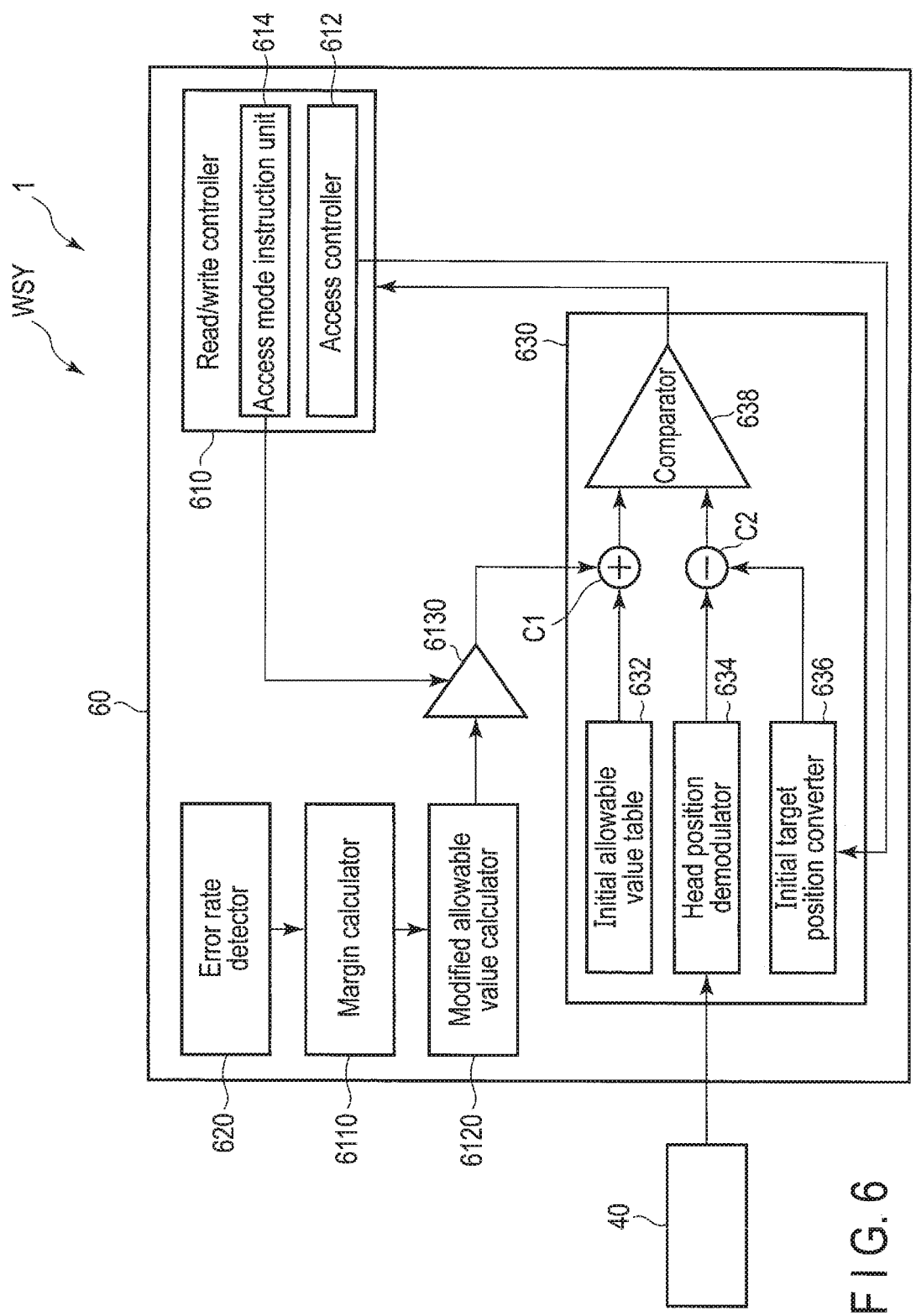
F I G. 6

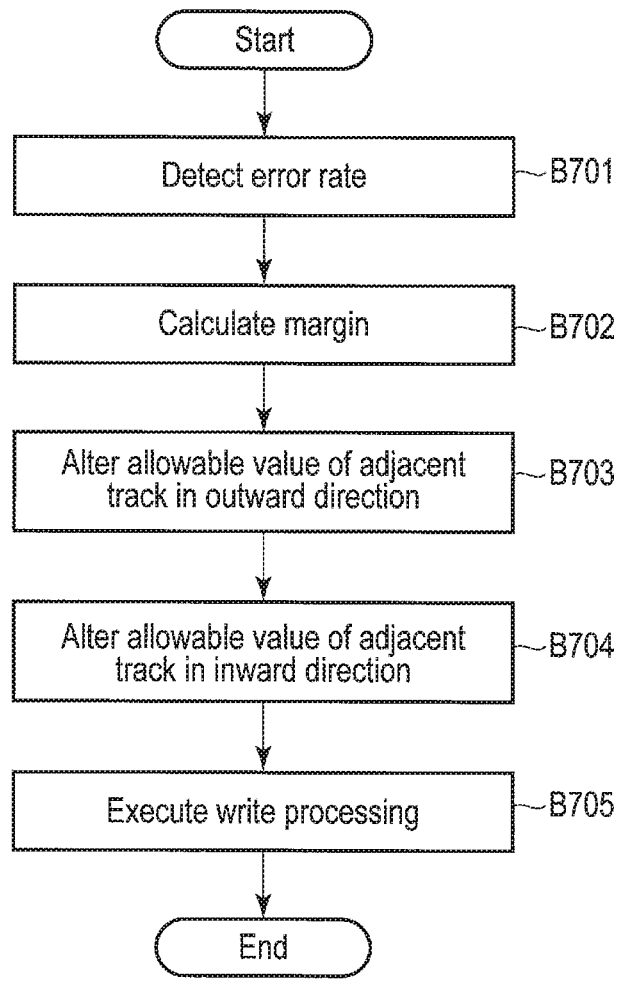
F I G. 7

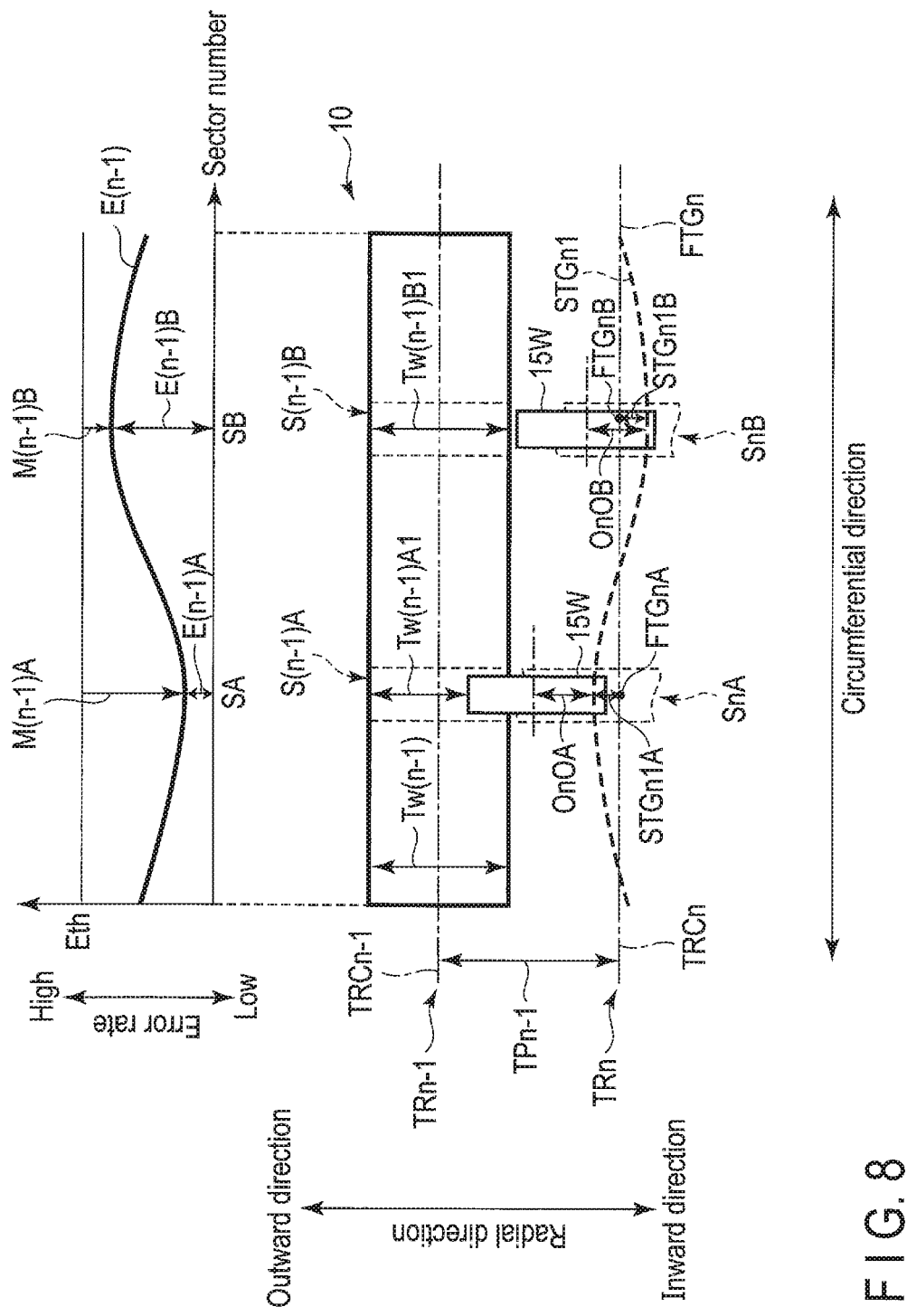
F I G. 8

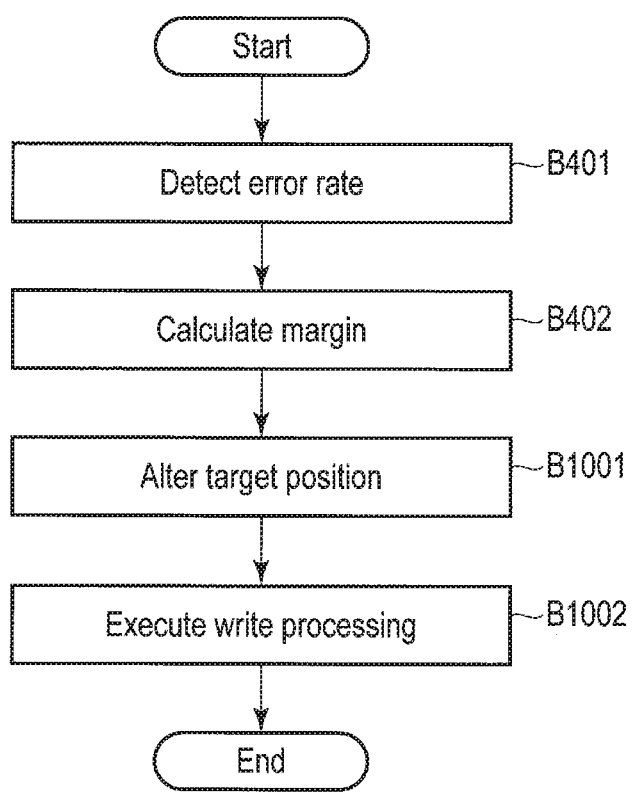
F I G. 10

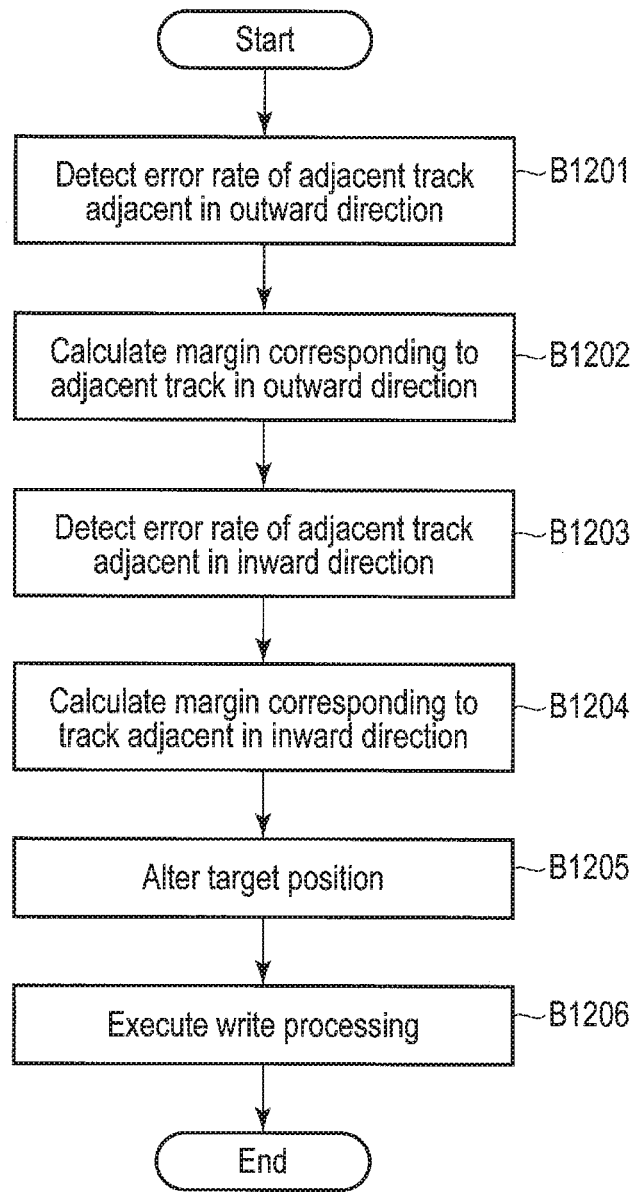
F I G. 12

MAGNETIC DISK DEVICE AND WRITE PROCESSING METHOD

CROSS-REFERENCE TO RELATED APPLICATIONS

This application is based upon and claims the benefit of priority from Japanese Patent Application No. 2018-173567, filed Sep. 18, 2018, the entire contents of which are incorporated herein by reference.

FIELD

Embodiments described herein relate generally to a magnetic disk device and a write processing method.

BACKGROUND

A magnetic disk device controls a position in a radial direction of a head by a function to prohibit write processing in a case where the head exceeds an allowable value (drift-off level: DOL) of off-track in the radial direction of a disk when writing data to a particular track, and controls a track width of a track (hereinafter referred to as adjacent track) adjacent in the radial direction to the particular track. The allowable value of off-track in the radial direction of the particular track is set according to a highest bit error rate in bit error rates of sectors of the adjacent track of a case where the adjacent track is read immediately after written, for example. Therefore, there is a possibility that achievement of high track per inch (TPI) of the magnetic disk device becomes difficult.

BRIEF DESCRIPTION OF THE DRAWINGS

FIG. 1 is a block diagram illustrating a configuration of a magnetic disk device according to an embodiment;

FIG. 2 is a diagram illustrating an example of write processing according to the embodiment;

FIG. 4 is a flowchart illustrating an example of a write processing method according to the embodiment;

FIG. 5 is a diagram illustrating an example of write processing according to a first modification;

FIG. 6 is a block diagram illustrating an example of a write processing system according to the first modification;

FIG. 7 is a flowchart illustrating an example of a write processing method according to the first modification;

FIG. 8 is a diagram illustrating an example of write processing according to a second modification;

FIG. 10 is a flowchart illustrating an example of a write processing method according to the second modification;

FIG. 12 is a flowchart illustrating an example of a write processing method according to the third modification.

DETAILED DESCRIPTION

Figure 3:
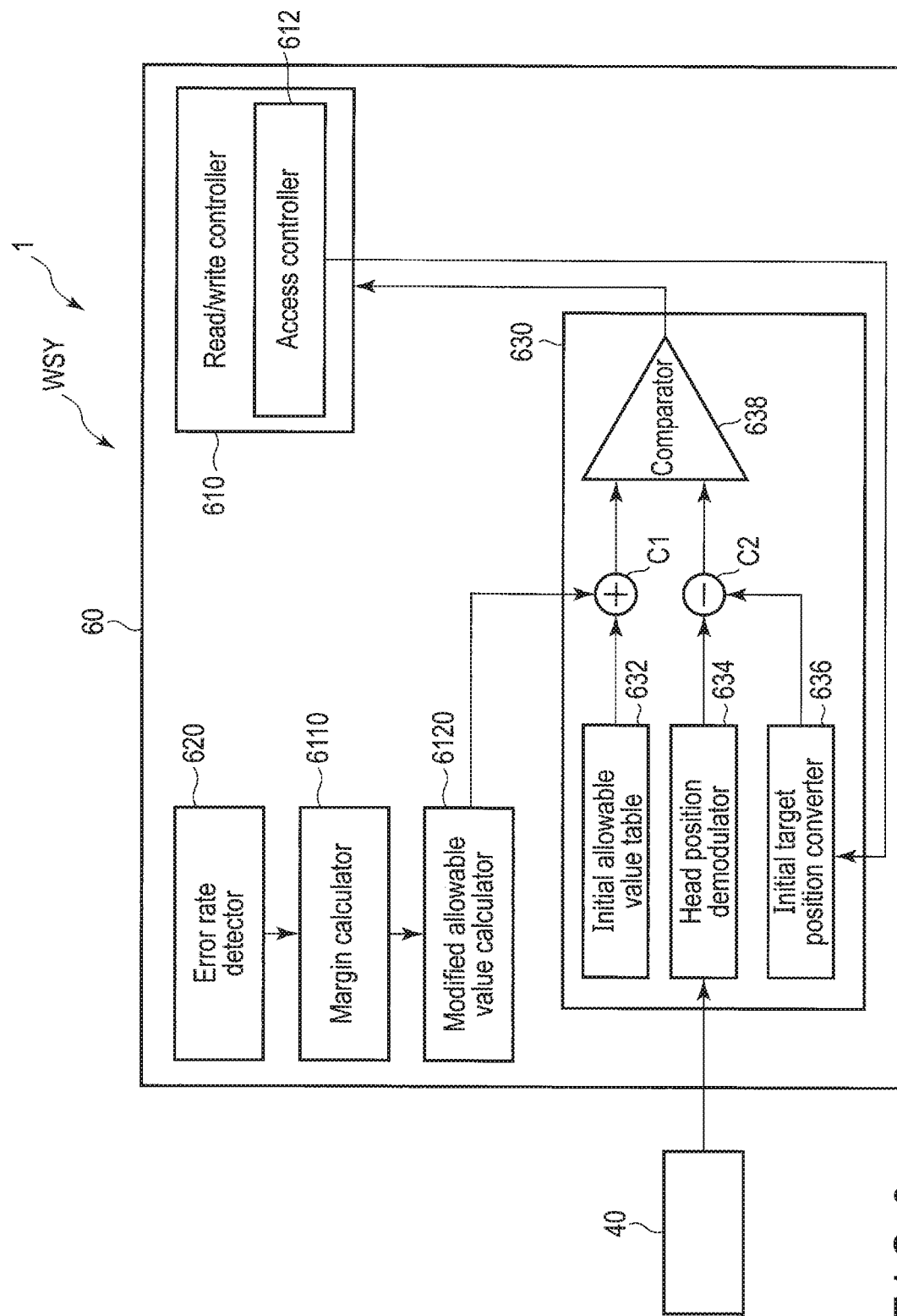
FIG. 3 is a block diagram illustrating an example of a write processing system WSY according to the embodiment.

In general, according to one embodiment, a magnetic disk device comprises: a disk; a head configured to write data to the disk and read data from the disk; and a controller configured to control the head to write a first track based on a first error rate read immediately after writing a second track adjacent in a radial direction of the disk to the first track.

According to another embodiment, a magnetic disk device comprises: a disk; a head configured to write data to the disk and read data from the disk; and a controller configured to make a first upper limit value in which a first sector of the first track is writable on a side of the second track larger than a second upper limit value in which a second sector different from the first sector of the first track is writable on the side of the second track, based on a first error rate read immediately after writing a second track adjacent in a radial direction of the disk of the first track.

According to another embodiment, a write processing method to be applied to a magnetic disk device including a disk and a head configured to write data to the disk and read data from the disk, the method comprises: controlling the head to write a first track based on a first error rate read immediately after writing a second track adjacent in a radial direction of the disk of the first track.

Hereinafter, embodiments will be described with reference to the drawings. Note that the drawings are merely examples and do not limit the scope of the invention.

EMBODIMENT

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, head amplifier IC or preamplifier) 30, a volatile memory 70, a buffer memory (buffer) 80, a nonvolatile memory 90, and a system controller 130 that is a one-chip integrated circuit, described below. Further, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as VCM) 14. The disk 10 is attached to the SPM 12 and rotates by driving of the spindle motor 12. The arm 13 and the VCM 14 constitute an actuator. The actuator controls the movement of the head 15 mounted on the arm 13 to a particular position on the disk 10 by driving of the VCM 14. Two or more numbers of the disk 10 and the head 15 may be provided.

A user data region 10a usable by a user and a system area 10b for writing information necessary for system management are allocated to a data writable region in the disk 10. Hereinafter, a direction orthogonal to a radial direction of the disk 10 is referred to as a circumferential direction.

The head 15 includes a write head 15W and a read head 15R mounted on a slider as a main body. The write head 15W writes data to the disk 10. The read head 15R reads data recorded on the track of the disk 10. Note that the write head 15W may be simply referred to as a head 15, the read head 15R may be simply referred to as a head 15, and the write head 15W and the read head 15R may be collectively referred to as a head 15 in some cases. The "track" is used as one of a plurality of regions divided in the radial direction of the disk 10, data extending in the circumferential direction of the disk 10, data written in the track, and various other meanings. A "sector" is used as one of a plurality of regions obtained by dividing the track in the circumferential direction, data written at a particular position on the disk 10, data written in the sector, and various other meanings. Further, a width in the radial direction of the track is referred to as a track width, and a center position of the track width is referred to as a track center. Further, the track center may be simply referred to as a track. The track center is, for example, an approximate perfect circle arranged concentrically with the disk 10.

The driver IC 20 controls driving of the SPM 12 and the VCM 14 according to control of the system controller 130 (more specifically, an MPU 60 described below).

The head amplifier IC (preamplifier) 30 includes a read amplifier and a write driver. The read amplifier amplifies a read signal read from the disk 10 by the read head 15R and outputs the amplified read signal to the system controller 130 (more specifically, a read/write (R/W) channel 40 described below). The write driver outputs a write current corresponding to a signal output from the R/W channel 40 to the write head 15W.

The volatile memory 70 is a semiconductor memory in which stored data is lost when a power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host 100. Note that the buffer memory 80 may be integrally configured with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory in which stored data is recorded even when the power supply is cut off. The nonvolatile memory 90 is, for example, a NOR-type or NAND-type flash read only memory (flash ROM: FROM).

The system controller (controller) 130 is realized by using a large scale integrated circuit (LSI) called system-on-a-chip (SoC) in which a plurality of elements is integrated on a single chip, for example. The system controller 130 includes the read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the buffer memory 80, the nonvolatile memory 90, and the host system 100.

The R/W channel 40 executes signal processing of read data transferred from the disk 10 to the host 100 and write data transferred from the host 100 in response to an instruction from the MPU 60 described below. The R/W channel 40 has a circuit or a function to measure signal quality of the read data. The R/W channel 40 is electrically connected to, for example, the head amplifier IC 30, the HDC 50, the MPU 60, and the like.

The HDC 50 controls data transfer between the host 100 and the R/W channel 40 in response to an instruction from the MPU 60 to be described below. The HDC 50 is electrically connected to, for example, the R/W channel 40, the MPU 60, the volatile memory 70, the buffer memory 80, the nonvolatile memory 90, and the like.

The MPU 60 is a main controller that controls each part of the magnetic disk device 1. The MPU 60 controls the VCM 14 via the driver IC 20 and executes servo control for positioning the head 15. In addition, the MPU 60 controls the SPM 12 via the driver IC 20 to rotate the disk 10. The MPU 60 controls a write operation of data to the disk 10 and selects a save destination of the write data. Further, the MPU 60 controls a read operation of data from the disk 10 and controls processing of the read data. The MPU 60 is connected to each part of the magnetic disk device 1. The MPU 60 is electrically connected to, for example, the driver IC 20, the R/W channel 40, the HDC 50, and the like.

The MPU 60 includes a read/write controller 610, an error rate detector 620, and a position controller 630. The MPU 60 executes processing of these units, for example, the read/write controller 610, the error rate detector 620, the position controller 630, and the like on the firmware. Note that the MPU 60 may include these units, for example, the read/write controller 610, the error rate detector 620, and the position controller 630 as circuits.

The read/write controller 610 controls data read processing and data write processing according to a command from the host 100. The read/write controller 610 controls the VCM 14 via the driver IC 20, and positions the head 15 at a particular position on the disk 10 to read or write data. Hereinafter, "positioning the central portion of the head 15 (the write head 15W and the read head 15R) at a particular position" may be described as "positioning the head 15 (the write head 15W and the read head 15R) at a particular position" in some cases. Hereinafter, "positioning the central portion of the head 15 (the write head 15W and the read head 15R) at a position to be targeted (hereinafter referred to as a target position) of a particular track" may be described as "positioning the head 15 (the write head 15W and the read head 15R) at a particular track" in some cases. Further, "the central portion of the head 15 (the write head 15W and the read head 15R) is shifted from the target position of a particular track in the radial direction" may be described as "the head 15 (the write head 15W and the read head 15R) off-tracks from a particular track". The distance in the radial direction by which the head 15 (the write head 15W and the read head 15R) off-tracks may be referred to as an off-track amount. The read/write controller 610 stops (or prohibits) write processing to a particular track in a case where a radial position of the write head 15W in the radial direction exceeds an upper limit value (drift-off level (DOL)) (hereinafter referred to as an allowable value) of the off-track amount in the radial direction in a case where data is written to the particular track, and resumes the write processing to the particular track in a case where the radial position of the write head 15W becomes the allowable value or less, for example. In other words, the allowable value (the upper limit value) is equivalent to a distance that allows offset write in the radial direction. The read/write controller 610 may sequentially write data in one direction (one side) in the radial direction of the disk 10, or may write data to the disk 10 at random. The read/write controller 610 may sequentially read, in one direction (one side), a plurality of tracks aligned in the radial direction on the disk 10, or may read data written in the disk 10 at random. Hereinafter, "writing data to the disk 10" and "reading data from the disk 10" may be collectively referred to as "accessing" in some cases. Further, "sequentially writing data to the disk 10" and "sequentially reading data from the disk 10" may be referred to as "sequential access" in some cases.

The error rate detector 620 detects a bit error rate of at least one particular recording region in a plurality of recording regions obtained by dividing the disk 10 in the radial direction, for example, a bit error rate of a particular track. Hereinafter, the bit error rate is simply referred to as an error rate. Immediately after a particular track is written, the error rate detector 620 reads this track and detects the error rate. Hereinafter, the "error rate detected by reading a particular track immediately after writing the particular track" may be referred to as an "on-track error rate", and "change in the on-track error rate for each circumferential position of a particular track" may be referred to as "change in the error rate" or may be simply referred to as the "error rate" in some cases. The on-track error rate is an error rate detected in a state of being not influenced by fringing that a recording magnetic field of the head 15 or magnetization transition of the disk 10 leaks in the radial direction when another track around a particular track is written after the particular track is written. The error rate detector 620 calculates a difference value between a threshold value of the error rate (hereinafter referred to as an error rate threshold value) and the on-track error rate of a particular track. Here, the error rate threshold value corresponds to, for example, an error rate at which data written in the disk 10 cannot be read or a maximum error rate at which data written in the disk 10 can be read. Hereinafter, the "difference value between the on-track error rate and the error rate threshold value in a particular track" is referred to as a "margin" and "change in the margin at each circumferential position of a particular track" is referred to as "change in the margin" or may be simply referred to as the "margin". For example, when a particular track is written, the error rate detector 620 may detect the on-track error rate of each position in the circumferential direction of a particular track, for example, the on-track error rate of each sector. Hereinafter, the position in the circumferential direction of a particular track may be referred to as a circumferential position in some cases. When data is written to a particular track after data is written to a track adjacent to the particular track (hereinafter the track is referred to as an adjacent track), the error rate detector 620 may detect the on-track error rate of each circumferential position, for example, each sector, of the adjacent track. In this case, the error rate detector 620 calculates the margin corresponding to the difference value between the error rate threshold value corresponding to the adjacent track and the on-track error rate of the adjacent track. Further, the error rate detector 620 may detect the on-track error rate of each sector of a specific track set for each particular recording region of the disk 10 at particular timing. The error rate detector 620 may record the detected on-track error rate and margin of each sector of the particular track in a particular recording region, for example, on the disk 10 or the non-volatile memory 90.

The position controller 630 controls the position in the radial direction of the head 15 (hereinafter, the position is referred to as radial position) in at least one particular recording region in a plurality of recording regions obtained by dividing the disk 10 in the radial direction, for example, in a particular track. For example, the position controller 630 controls the radial position of the head 15 (the write head 15W and the read head 15R) based on the on-track error rate of the adjacent track of a particular track. In other words, the position controller 630 controls the radial position of the head 15 (the write head 15W and the read head 15R) based on the margin of the adjacent track of a particular track. The position controller 630 controls the allowable value in a particular sector based on the on-track error rate (margin) of a particular sector (hereinafter referred to as an adjacent sector) of the adjacent track adjacent in the radial direction of a particular position in the circumferential direction of a particular track, for example, of the particular sector. In a case where the on-track error rate of the adjacent sector adjacent to the particular sector is high, there is a high possibility that data in the adjacent sector adjacent to the particular sector cannot be read due to the fringing that occurs when data is written to the particular sector. Therefore, the position controller 630 makes the allowable value in the particular sector small, makes the allowable value in the particular sector slightly large, or maintains the allowable value in the particular sector. In other words, in a case where the margin of the adjacent sector adjacent to the particular sector is small, there is a high possibility that data in the adjacent sector adjacent to the particular sector cannot be read due to the fringing that occurs when data is written to the particular sector. Therefore, the position controller 630 makes the allowable value in the particular sector small, makes the allowable value in the particular sector slightly large, or maintains the allowable value in the particular sector. In a case where the on-track error rate of the adjacent sector adjacent to the particular sector is low, there is a low possibility that data in the adjacent sector adjacent to the particular sector cannot be read due to the fringing that occurs when data is written to the particular sector. Therefore, the position controller 630 makes the allowable value in the particular sector large. In other words, in a case where the margin of the adjacent sector adjacent to the particular sector is large, there is a low possibility that data in the adjacent sector adjacent to the particular sector cannot be read due to the fringing that occurs when data is written to the particular sector. Therefore, the position controller 630 makes the allowable value in the particular sector large. Note that, in a case where data is written to the particular sector of the particular track, the position controller 630 may control the allowable value in the particular sector based on the on-track error rate (margin) of a particular sector of a track located in the radial direction of the particular sector. In a case where data is written to the particular sector of the particular track, the position controller 630 may control a target position in the particular sector based on the on-track error rate (margin) of the adjacent sector adjacent in the radial direction of the particular sector of the particular track.

FIG. 2 is a diagram illustrating an example of write processing according to the present embodiment. FIG. 2 illustrates a diagram of an example of change E(n−1) in the on-track error rate with respect to each circumferential position of a track TR(n−1) in the upper row and a diagram of an example of the write processing in a track TRn of the disk 10 in the lower row.

FIG. 2 illustrates the tracks TR(n−1) and TRn that are adjacent in the radial direction. FIG. 2 illustrates a track center TRC(n−1) of the track TR(n−1). In FIG. 2, the track TR(n−1) is written with the track center TRC(n−1) as a target position. In FIG. 2, the track TR(n−1) is located in an outward direction with respect to the track TRn. In FIG. 2, the track TR(n−1) linearly extends for convenience of description but in practice the track TR(n−1) is curved along the shape of the disk 10. Further, the track TR(n−1) may extend in the circumferential direction while varying in a wavy manner in the radial direction. The track TR(n−1) is written with a track width Tw(n−1). The track TR(n−1) includes a sector S(n−1)A and a sector S(n−1)B different from the sector S(n−1)A. Here, "A" of the sector S(n−1)A and "B" of the sector S(n−1)B indicate numbers of the sectors, respectively. Sectors having the same sector number are located at the same circumferential position on the disk 10, for example. The track TR(n−1) has a track width Tw(n−1)A1 in the sector S(n−1)A and has a track width Tw(n−1)B1 in the sector S(n−1)B. The track width Tw(n−1)A1 is smaller than the track width Tw(n−1). The track width Tw(n−1)A1 corresponds to a lower limit value that can be read by the read head 15R, for example. That is, when the track width becomes smaller than the track width Tw(n−1)A1, data cannot be read by the read head 15R. The track width Tw(n−1)B1 is, for example, equivalent to the track width Tw(n−1). FIG. 2 illustrates the track center TRCn of the track TRn. In FIG. 2, the track TRn is written with the track center TRCn as the target position. FIG. 2 illustrates change FDnO in the initially set allowable value at each circumferential position in the outward direction in the track TRn, and change SDnO in the allowable value at each circumferential position in the outward direction in the track TRn, the allowable value having been altered based on the change E(n−1) in the error rate of the track TR(n−1). Hereinafter, the "change in the initially set allowable value at each circumferential position of a particular track" may be referred to as "change in the initially set allowable value" or may be simply referred to as "initial allowable value". Further, the "change in the allowable value at each circumferential position of a particular track, the allowable value having been altered based on the change in the error rate of a track located in the radial direction of the particular track" may be referred to as "change in a modified allowable value" or may be simply referred to as a "modified allowable value". In the example illustrated in FIG. 2, the change FDnO in the initial allowable value is constant in the circumferential direction of the track TRn. For example, the change FDnO in the initial allowable value is set based on the maximum error rate in the change E(n−1) in the error rate of the track TR(n−1). The track TRn includes a sector SnA adjacent in the inward direction to the sector S(n−1)A, and a sector SnB adjacent in the inward direction to the sector S(n−1)B and different from the sector SnA. Here, "A" of the sector SnA and "B" of the sector SnB indicate numbers of the sectors, respectively. FIG. 2 illustrates an initially set allowable value FDnOA in the outward direction in the sector SnA of the track TRn, an allowable value SDnOA in the outward direction in the sector SnA of the track TRn, the allowable value SDnOA having been altered based on the error rate of the sector S(n−1)A of the track TR(n−1), an initially set allowable value FDnOB in the outward direction in the sector SnB of the track TRn, and an allowable value SDnOB in the outward direction in the sector SnB of the track TRn, the allowable value SDnOB having been altered based on the error rate of the sector S(n−1)B of the track TR(n−1). Hereinafter, the "initially set allowable value in a particular sector of a particular track" may be simply referred to as "initial allowable value". Further, the "allowable value in a sector of a particular track, the allowable value having been altered based on the error rate of a sector located in the radial direction of the sector of the particular track" may be simply referred to as "modified allowable value". In the example illustrated in FIG. 2, the initial allowable values FDnOA and FDnOB are the same value in the outward direction from the track center TRCn. The modified allowable value SDnOA is larger than the initial allowable value FDnOA in the outward direction from the track center TRCn. The modified allowable value SDnOA is larger than the allowable value SDnOB in the outward direction from the track center TRCn. Further, the initial allowable value FDnOB and the modified allowable value SDnOB are the same value in the outward direction from the track center TRCn. FIG. 2 illustrates the write head 15W when writing the sector SnA and the write head 15W when writing the sector SnB. Further, FIG. 2 illustrates an interval (track pitch) TPn−1 between the track center TRC(n−1) of the track TR(n−1) and the track center TRCn of the track TRn.

In the diagram illustrating the change E(n−1) in the error rate in FIG. 2, the horizontal axis represents the sector number and the vertical axis represents the error rate. The error rate becomes higher as the vertical axis goes in the direction of the arrow of "high", and the error rate becomes lower as the vertical axis goes in the direction of the arrow of "low". FIG. 2 illustrates an error rate threshold value Eth. FIG. 2 illustrates an on-track error rate E(n−1)A in the sector S(n−1)A corresponding to the sector number A of the track TR(n−1), and an on-track error rate E(n−1)B in the sector S(n−1)B corresponding to the sector number B of the track TR(n−1). In the example illustrated in FIG. 2, the on-track error rate E(n−1)A is lower than the on-track error rate E(n−1)B. For example, the on-track error rate E(n−1)B is the highest error rate in the change E(n−1) in the error rate. Further, FIG. 2 illustrates a margin M(n−1)A corresponding to a difference value between the on-track error rate E(n−1)A and the error rate threshold value Eth, and a margin M(n−1)B corresponding to a difference value between the on-track error rate E(n−1)B and the error rate threshold value Eth. In the example illustrated in FIG. 2, the margin M(n−1)A is larger than the margin M(n−1)B. That is, the off-track amount of the write head 15W in the outward direction in the sector SnA may be larger than the off-track amount of the write head 15W in the outward direction in the sector SnB.

In the example illustrated in FIG. 2, in a case where data is written to the track TRn, the error rate detector 620 detects the error rate of each circumferential position of the track TR(n−1) and detects the change E(n−1) in the error rate of the track TR(n−1). The error rate detector 620 calculates, for example, change in the margin corresponding to the difference value between the error rate threshold value Eth and the change E(n−1) in the error rate. For example, the error rate detector 620 calculates the margin M(n−1)A corresponding to the sector S(n−1)A based on the on-track error rate E(n−1)A corresponding to the sector S(n−1)A and the error rate threshold value Eth. The error rate detector 620 calculates the margin M(n−1)B corresponding to the sector S(n−1)B based on the on-track error rate E(n−1)B corresponding to the sector S(n−1)B and the error rate threshold value Eth.

In the example illustrated in FIG. 2, in a case where data is written to the track TRn, the position controller 630 alters the change FDnO in the initial allowable value in the outward direction of the track TRn to the change SDnO in the modified allowable value in the outward direction based on the change in the margin (the change E(n−1) in the error rate). For example, the position controller 630 alters the initial allowable value FDnOA in the outward direction to the modified allowable value SDnOA in the outward direction based on the margin M(n−1)A in the sector SnA. Further, the position controller 630 alters the initial allowable value FDnOB in the outward direction to the modified allowable value SDnOB in the outward direction based on the margin M(n−1)B in the sector SnB.

In the example illustrated in FIG. 2, the read/write controller 610 writes the track TRn based on the change SDnO in the modified allowable value in the outward direction. The read/write controller 610 stops the write processing at a radial position in the outward direction with respect to the modified allowable value SDnOA in the outward direction in the sector SnA. In other words, the read/write controller 610 writes the sector SnA within the range of the modified allowable value SDnOA larger than the initial allowable value FDnOA in the outward direction. Therefore, in the sector S(n−1)A of the track TR(n−1), the track width of the track TR(n−1) is equal to or larger than the track width Tw(n−1)A1. That is, the radial position of the write head 15W is controlled in the sector SnA of the track TRn such that the track width of the track TR(n−1) in the sector S(n−1)A of the track TR(n−1) becomes the track width Tw(n−1)A1 or more, whereby the sector SnA of the track TR(n−1) can be reliably readable. Further, the read/write controller 610 stops the write processing at a radial position in the outward direction with respect to the modified allowable value SDnOB in the outward direction in the sector SnB. In other words, the read/write controller 610 writes the sector SnB in the range of the modified allowable value SDnOA approximately equal to the initial allowable value FDnOB. Therefore, in the sector S(n−1)B of the track TR(n−1), the track width of the track TR(n−1) becomes the track width Tw(n−1)B1 (=Tw(n−1)). The read/write controller 610 can write data up to the radial position closer to the track center TRC(n−1) in the sector SnA than in the sector SnB. Note that, in a case where data is written to the track TRn after data is written to a track located in the inward direction with respect to the track TRn, the write processing can be similarly executed to the case where the track TRn is written after the track TR(n−1) is written illustrated in FIG. 2. In the present embodiment, the write head 15W sequentially accesses the track TRn after writing the track TR(n−1) and writes the track TRn based on the change SDnO in the modified allowable value.

FIG. 3 is a block diagram illustrating an example of a write processing system WSY according to the present embodiment.

The MPU 60 includes a write processing system WSY for executing the write processing. The write processing system WSY includes the read/write controller 610, the error rate detector 620, the position controller 630, a margin calculator 6110, and a modified allowable value calculator 6120. The read/write controller 610 includes an access controller 612. The position controller 630 includes an initial allowable value table 632, a head position demodulator 634, an initial target position converter 636, a calculation unit C1, and a calculation unit C2.

The margin calculator 6110 calculates the margin as the difference value between the error rate threshold value and the error rate. The modified allowable value calculator 6120 calculates a modification amount of the allowable value (hereinafter, the modification amount is referred to as an allowable value modification amount) based on the margin. The initial allowable value table 632 holds the initial allowable value corresponding to each track of the disk 10. The head position demodulator 634 demodulates servo information read from the disk 10 and input from the R/W channel 40 and detects the radial position of the current (or actual) head 15 in the disk 10 (hereinafter, the radial position is referred to as an actual position). The initial target position converter 636 converts a specified address into the initial target position. A comparator 638 compares deviation of the actual position with respect to the initial target position (hereinafter, the deviation is referred to as positioning error) with the modified allowable value, and outputs a signal for allowing write (hereinafter referred to as a write allowance signal) or a signal for prohibiting write (hereinafter referred to as a write prohibition signal) according to a comparison result. For example, the comparator 638 outputs the write prohibition signal in a case where the positioning error is larger than the modified allowable value, and outputs the write allowance signal in a case where the positioning error is equal to or smaller than the modified allowable value. The read/write controller 610 executes the write processing in a case of receiving the write allowance signal, and prohibits (or stops) the write processing in a case of receiving the write prohibition signal. The access controller 612 outputs, for example, a signal for causing the head 15 to access an address specified by the host 100 (hereinafter, the signal is simply referred to as an address).

The error rate detector 620 outputs the error rate to the margin calculator 6110. The error rate is input to the margin calculator 6110. The margin calculator 6110 outputs the margin to the modified allowable value calculator 6120. The margin is input to the modified allowable value calculator 6120. The modified allowable value calculator 6120 outputs the allowable value modification amount to the calculation unit C1.

The initial allowable value table 632 outputs the initial allowable value to the calculation unit C1.

The initial allowable value and the allowable value modification amount are input to the calculation unit C1. The calculation unit C1 outputs the modified allowable value obtained by adding the allowable value modification amount to the initial allowable value to the comparator 638. The servo information is input from the R/W channel 40 to the head position demodulator 634. The head position demodulator 634 outputs the actual position to the calculation unit C2. The access controller 612 outputs the specified address to the initial target position converter 636. The specified address is input to the initial target position converter 636. The initial target position converter 636 outputs the initial target position to the calculation unit C2. The actual position and the initial target position are input to the calculation unit C2. The calculation unit C2 outputs the positioning error obtained by subtracting the initial target position from the actual position to the comparator 638. The modified allowable value and the positioning error are input to the comparator 638. The comparator 638 compares the modified allowable value with the positioning error, and outputs the write allowance signal or the write prohibition signal to the read/write controller 610 according to the comparison result.

FIG. 4 is a flowchart illustrating an example of a write processing method according to the present embodiment.

The MPU 60 detects the error rate of an adjacent track adjacent to a particular track (B401). For example, the MPU 60 detects change in the error rate of the adjacent track adjacent to the particular track. The MPU 60 calculates the margin in the adjacent track based on the error rate of the adjacent track adjacent to the particular track and the error rate threshold value (B402). For example, the MPU 60 calculates change in the margin in the adjacent track based on the change in the error rate of the adjacent track adjacent to the particular track and the error rate threshold value. The MPU 60 alters the allowable value (change in the allowable value) of the particular track based on the margin (change in the margin) corresponding to the adjacent track adjacent to the particular track (B403). For example, the MPU 60 alters the change in the allowable value of the particular track based on the change in the margin corresponding to the adjacent track adjacent to the particular track. In a case where the margin corresponding to an adjacent sector adjacent to a particular sector of the particular track is large, the MPU 60 makes the allowable value of the particular sector large. In a case where the margin corresponding to the adjacent sector adjacent to the particular sector of the particular track is small, the MPU 60 makes the allowable value of the particular sector small, makes the allowable value of the particular sector slightly large, or maintains the allowable value of the particular sector. The MPU 60 executes the write processing for the particular track based on the modified allowable value (change in the modified allowable value) (B404) and terminates the processing. For example, the MPU 60 executes the write processing with the track center of the particular track as the target position based on the change in the modified allowable value.

According to the present embodiment, the magnetic disk device 1 detects the error rate (change in the error rate) of an adjacent track adjacent to a particular track, calculates the margin (change in the margin) corresponding to the adjacent track based on the detected error rate (change in the error rate) of the adjacent track and the error rate threshold value, alters the allowable value (change in the allowable value) of the particular track based on the margin corresponding to the adjacent track, and writes data to the particular track based on the modified allowable value (change in the modified allowable value). Therefore, the magnetic disk device 1 can suppress the write head 15W exceeding the allowable value to stop the write processing. Therefore, the magnetic disk device 1 can narrow the track pitch while maintaining the frequency of stopping the write processing. Therefore, the magnetic disk device 1 can improve the data recording capacity.

Next, a magnetic disk device according to a modification will be described. In the modification, the same reference numerals are given to the same parts as those in the above embodiment, and a detailed description thereof will be omitted.

(First Modification)

A magnetic disk device 1 of a first modification is different from the above-described embodiment in writing adjacent tracks adjacent to a particular track on both sides in a radial direction.

FIG. 5 is a diagram illustrating an example of write processing according to the first modification. FIG. 5 is a diagram illustrating an example of write processing in tracks TR(n−2) and TRn of a disk 10 in a lower row.

FIG. 5 illustrates tracks TR(n−2), TR(n−1), and TRn arranged in succession in the radial direction. That is, the tracks TR(n−2) and TR(n−1) are adjacent in the radial direction. The tracks TR(n−1) and TRn are adjacent in the radial direction.

FIG. 5 illustrates change TDnO in an allowable value obtained by adjusting change SDnO in a modified allowable value in an outward direction in the track TRn, the change SDnO having been altered based on change E(n−1) in an error rate of the track TR(n−1). Hereinafter, the "change in an allowable value obtained by adjusting change in a modified allowable value" is referred to as "change in an adjusted allowable value" or may be simply referred to as "adjusted allowable value". FIG. 5 illustrates a track center TRC(n−2) of the track TR(n−2). In FIG. 5, the track TR(n−2) is written with the track center TRC(n−2) as a target position. FIG. 5 illustrates change FD(n−2)I in an initial allowable value in an inward direction in the track TR(n−2), change SD(n−2)I in the modified allowable value in the inward direction in the track TR(n−2), the change having been altered based on the change E(n−1) in the error rate of the track TR(n−1), and change TD(n−2)I in the adjusted allowable value obtained by adjusting the change SD(n−2)I in the modified allowable value. In the example illustrated in FIG. 5, the change FD(n−2)I in the initial allowable value is constant in a circumferential direction of the track TR(n−2). For example, the change FD(n−2)I in the initial allowable value is set based on the maximum error rate in the change E(n−1) in the error rate of the track TR(n−1). For example, the change FD(n−2)I in the initial allowable value is symmetrical to change FDnO in the initial allowable value with a track center TRC(n−1) as an axis of symmetry. For example, the change SD(n−2)I in the modified allowable value is symmetrical to change SDnO in the modified allowable value with a track center TRC(n−1) as an axis of symmetry. For example, the change TD(n−2)I in the adjusted allowable value is symmetrical to change TDnO in the adjusted allowable value with a track center TRC(n−1) as an axis of symmetry.

FIG. 5 illustrates an allowable value TDnOA in the outward direction obtained by adjusting a modified allowable value SDnOA in the outward direction and an allowable value TDnOB in the outward direction obtained by adjusting a modified allowable value SDnOB in the outward direction. Hereinafter, the "allowable value obtained by adjusting the modified allowable value" may be simply referred to as "adjusted allowable value". In the example illustrated in FIG. 5, an adjusted allowable value TDnOA is smaller than the modified allowable value SDnOA and is larger than the initial allowable value FDnOA in the outward direction from the track center TRCn. For example, the adjusted allowable value TDnOA is equal to or less than about half of the modified allowable value SDnOA in the outward direction from the track center TRCn. The adjusted allowable value TDnOB is the same value as the initial allowable value FDnOB in the outward direction from the track center TRCn.

The track TR(n−2) includes a sector S(n−2)A adjacent in the inward direction to the sector S(n−1)A, and a sector S(n−2)B adjacent in the inward direction to the sector S(n−1)B and different from the sector S(n−2)A. Here, "A" of the sector S(n−2)A and "B" of the sector S(n−2)B indicate numbers of the sectors, respectively. FIG. 5 illustrates an initial allowable value FD(n−2)IA in the inward direction in the sector S(n−2)A of the track TR(n−2), a modified allowable value SD(n−2)IA in the inward direction in the sector S(n−2)A of the track TR(n−2), the modified allowable value SD(n−2)IA having been altered based on an error rate E(n−1)A of the sector S(n−1)A of the track TR(n−1), an adjusted allowable value TD(n−2)IA in the inward direction obtained by adjusting the modified allowable value SD(n−2)IA in the inward direction, an allowable value FD(n−2)IB in the inward direction in the sector S(n−2)B of the track TR(n−2), a modified allowable value SD(n−2)IB in the inward direction in the sector S(n−2)B of the track TR(n−2), the modified allowable value SD(n−2)IB having been altered based on an error rate E(n−1)B of the sector S(n−1)B of the track TR(n−1), and an adjusted allowable value TD(n−2)IB in the inward direction obtained by adjusting the modified allowable value SD(n−2)IB in the inward direction. In the example illustrated in FIG. 5, the initial allowable values FD(n−2)IA and FD(n−2)IB are the same value in the inward direction from the track center TRC(n−2). The modified allowable value SD(n−2)IA is larger than the initial allowable value FD(n−2)IA in the inward direction from the track center TRC(n−2). The modified allowable value SD(n−2)IA is larger than the modified allowable value SD(n−2)IB in the inward direction from the track center TRC(n−2). The initial allowable value FD(n−2)IB and the modified allowable value SD(n−2)IB are the same value in the inward direction from the track center TRC(n−2). The adjusted allowable value TD(n−2)IA is smaller than the modified allowable value SD(n−2)IA and is larger than the initial allowable value FD(n−2)IA in the inward direction from the track center TRC(n−2). For example, an adjusted allowable value TD(n−1)IA is equal to or less than about half of the modified allowable value SD(n−2)IA in the inward direction from the track center TRC(n−2). The adjusted allowable value TD(n−2)IB is the same value as the initial allowable value FD(n−2)IB in the inward direction from the track center TRC(n−2). FIG. 5 illustrates a write head 15W when writing the sector S(n−2)A and the write head 15W when writing the sector S(n−2)B. Further, FIG. 5 illustrates an interval (track pitch) TPn−2 between the track center TRC(n−1) of the track TR(n−1) and the track center TRC(n−2) of the track TR(n−2).

In the example illustrated in FIG. 5, in a case where data is written to the track TRn and the track TR(n−2) after written to the track TR(n−1), a position controller 630 adjusts the change SD(n−2)I in the modified allowable value in the inward direction, which is calculated based on change in a margin (change E(n+1) in the error rate) and the change FD(n−2)I in the initial allowable value in the inward direction of the track TR(n−2), to the change TD(n−2)I in the adjusted allowable value in the inward direction. Further, in a case where data is written to the track TRn and the track TR(n−2) after written to the track TR(n−1), the position controller 630 adjusts the change SDnO in the modified allowable value in the outward direction, which is calculated based on the change in a margin and the change FDnO in the initial allowable value in the outward direction of the track TRn, to the change TDnO in the adjusted allowable value in the outward direction. For example, the position controller 630 adjusts the modified allowable value SD(n−2)IA calculated based on the margin M(n−1)A and the initial allowable value FD(n−2)IA in the inward direction to the adjusted allowable value TD(n−2)IA in the sector S(n−2)A. The position controller 630 adjusts the modified allowable value SD(n−2)IB calculated based on the margin M(n−1)B and the initial allowable value FD(n−2)IB in the inward direction to the adjusted allowable value TD(n−2)IB in the sector S(n−2)B. Further, the position controller 630 adjusts the modified allowable value SDnOA in the outward direction calculated based on the margin M(n−1)A and the initial allowable value FDnOA in the outward direction to the adjusted allowable value TDnOA in the sector SnA. The position controller 630 adjusts the modified allowable value SDnOB in the outward direction calculated based on the margin M(n−1)B and the initial allowable value FDnOB in the inward direction to the adjusted allowable value TDnOB in the sector SnB.

In the example illustrated in FIG. 5, a read/write controller 610 writes the track TRn based on the change TDnO in the adjusted allowable value in the outward direction and writes the track TR(n−2) based on the change TD(n−2)I in the adjusted allowable value in the inward direction.

The read/write controller 610 stops write processing at a radial position in the outward direction with respect to the allowable value TDnOA in the outward direction in the sector SnA, and stops the write processing at a radial position in the inward direction with respect to the adjusted allowable value TD(n−2)IA in the inward direction in the sector S(n−2)A. In other words, the read/write controller 610 can write the sector SnA within a range of the adjusted allowable value TDnOA in the outward direction, which is larger than the initial allowable value FDnOA in the outward direction and is smaller than the modified allowable value SDnOA in the outward direction. The read/write controller 610 can write the sector S(n−2)A within a range of the adjusted allowable value TD(n−2)IA in the inward direction, which is larger than the initial allowable value FD(n−2)IA in the inward direction and is smaller than the modified allowable value SD(n−2)IA in the inward direction. For example, there is a possibility that the read/write controller 610 randomly accesses adjacent sectors adjacent to the sector S(n−1)A on both sides in the radial direction and the write head 15W is located at the modified allowable value SDnOA and writes data in the sector SnA, and the write head 15W is located at a modified allowable value SD(n−1)IA and writes data in the sector S(n−2)A. In this case, a track width of the track TR(n−1) is a track width Tw(n−1)A2. Therefore, there is a possibility that data cannot be read in this case.

For example, in the first modification, there is a possibility that the read/write controller 610 randomly accesses adjacent sectors adjacent to the sector S(n−1)A on both sides in the radial direction, and the write head 15W is located at the adjusted allowable value TDnOA and writes data in the sector SnA and the write head 15W is located at the adjusted allowable value TD(n−1)IA and writes data in the sector S(n−2)A. In this case, a track width of the track TR(n−1) is a track width Tw(n−1)A1. Therefore, data can be read in the first modification.

The read/write controller 610 stops the write processing at a radial position in the outward direction with respect to the adjusted allowable value TDnOB in the outward direction in the sector SnB. In other words, the read/write controller 610 writes the sector SnB within a range of the adjusted allowable value TDnOB in the outward direction, which is approximately equal to the initial allowable value FDnOB in the outward direction. The read/write controller 610 stops the write processing at a radial position in the outward direction with respect to the adjusted allowable value TD(n−2)IB in the inward direction in the sector S(n−2)B. In other words, the read/write controller 610 writes the sector S(n−2)B within a range of the adjusted allowable value TD(n−2)IB in the inward direction, which is approximately equal to the initial allowable value FD(n−2)IB in the inward direction.

FIG. 6 is a block diagram illustrating an example of a write processing system WSY according to the first modification.

The write processing system WSY includes a gain (or switch) 6130. The read/write controller 610 has an access mode instruction unit 614.

The access mode instruction unit 614 outputs an access mode to a particular address, for example, a signal (hereinafter referred to as an access mode signal) instructing whether sequentially accessing or randomly accessing the particular address. The gain (switch) 6130 adjusts the allowable value modification amount based on the access mode signal. For example, the gain 6130 halves the allowable value modification amount when receiving a signal to randomly access both sides of a particular address.

A modified allowable value calculator 6120 outputs the allowable value modification amount to the gain 6130. The access mode instruction unit 614 outputs the access mode signal to the gain 6130. The gain 6130 outputs the allowable value modification amount adjusted based on the access mode signal to a calculation unit C1.

FIG. 7 is a flowchart illustrating an example of a write processing method according to the first modification.

An MPU 60 detects an error rate of a particular track having data written to both sides in the radial direction (B701). The MPU 60 calculates the margin of the particular track (B702). The MPU 60 alters the allowable value of the adjacent track adjacent in the outward direction to the particular track (B703). For example, the MPU 60 alters the modified allowable value in the inward direction of the adjacent track in the outward direction, which is calculated based on the margin and the initial allowable value of the adjacent track adjacent in the outward direction to the particular track, to the adjusted allowable value in the inward direction smaller than the modified allowable value in the inward direction. The MPU 60 alters the allowable value of the adjacent track adjacent in the inward direction to the particular track (B704). For example, the MPU 60 alters the modified allowable value in the outward direction of the adjacent track in the inward direction, which is calculated based on the margin and the initial allowable value of the adjacent track adjacent in the inward direction to the particular track, to the adjusted allowable value in the outward direction smaller than the modified allowable value in the outward direction. The MPU 60 executes the write processing with a track center of the particular track as a target position based on the altered allowable value of the track in the outward direction and the altered allowable value of the track in the inward direction (B705), and terminates the processing.

According to the first modification, the magnetic disk device 1 detects the error rate of a particular track having data written to adjacent tracks on both sides in the radial direction, and calculates the margin corresponding to the particular track based on the error rate of the particular track and an error rate threshold value. The magnetic disk device 1 alters the modified allowable value in the inward direction of the adjacent track in the outward direction, which is calculated based on the margin and the initial allowable value of the adjacent track adjacent in the outward direction to the particular track, to the adjusted allowable value in the inward direction smaller than the modified allowable value in the inward direction. The magnetic disk device 1 alters the modified allowable value in the outward direction of the adjacent track in the inward direction, which is calculated based on the margin and the initial allowable value of the adjacent track adjacent in the inward direction to the particular track, to the adjusted allowable value in the outward direction smaller than the modified allowable value in the outward direction. The magnetic disk device 1 writes data to the particular track based on the altered adjusted allowable value corresponding to the adjacent track in the outward direction and the altered adjusted allowable value corresponding to the adjacent track in the inward direction. Therefore, the magnetic disk device 1 can maintain the particular track width as a readable width even in a case of writing data to the adjacent tracks adjacent to the particular track on both sides in the radial direction. Therefore, the magnetic disk device 1 can narrow the track pitch while maintaining the frequency of stopping the write processing. Therefore, the magnetic disk device 1 can improve the data recording capacity.

(Second Modification)

A magnetic disk device 1 according to a second modification is different from the above-described embodiment and first modification in altering a target position of each circumferential position of a head 15 in a particular track based on a margin of an adjacent track adjacent to the particular track. Hereinafter, the "target position of each circumferential position of the head 15 (a write head 15W and a read head 15R)" may be referred to as "change in the target position", a "target path", or may be simply referred to as "target position".

An MPU 60 controls a target path of the head 15 (the write head 15W and the read head 15R) in a particular track based on change in an on-track error rate of an adjacent track adjacent track in a radial direction to the particular track (change in a margin). For example, a position controller 630 controls the target position of the head 15 in a particular sector based on the on-track error rate (margin) of an adjacent sector of an adjacent track adjacent in the radial direction to a particular sector of the particular track. In a case where the on-track error rate of the adjacent sector adjacent to a particular sector is high, the position controller 630 shifts the target position in the particular sector to an opposite side to the adjacent sector, slightly shifts the target position in the particular sector to the side of the adjacent sector, or maintains the target position in the particular sector. In other words, in a case where the margin of the adjacent sector adjacent to a particular sector is small, the position controller 630 shifts the target position in the particular sector to an opposite side to the adjacent sector, slightly shifts the target position in the particular sector to the side of the adjacent sector, or maintains the target position in the particular sector. In a case where the on-track error rate of the adjacent sector adjacent to a particular sector is low, the position controller 630 shifts the target position in the particular sector to the side of the adjacent sector. In other words, in a case where the margin of the adjacent sector adjacent to a particular sector is large, the position controller 630 shifts the target position in the particular sector to the side of the adjacent sector.

FIG. 8 is a diagram illustrating an example of write processing according to the second modification. FIG. 8 illustrates an initially set target path FTGn of the head 15 (the write head 15W and the read head 15R) in a track TRn, and a target path STGn1 of the head 15 (the write head 15W and the read head 15R) in the track TRn, the target path STGn1 having been altered based on change E(n−1) in an error rate of a track TR(n−1). Hereinafter, the "initially set target path at each circumferential position of a particular track" may be referred to as "change in an initial target position", an "initial target path", or simply referred to as "initial target position". Further, the "target path at each circumferential position of a particular track, the target path having been altered based on the change in the error rate of a track located in the radial direction of the particular track" may be referred to as "change in a modified target position", a "modified target path", or may be simply referred to as a "modified target position". In the example illustrated in FIG. 8, the initial target path FTGn corresponds to a track center TRCn of the track TRn. FIG. 8 illustrates an initially set target position FTGnA in a sector SnA of the track TRn, a target position STGn1A in the sector SnA of the track TRn, the target position STGn1A having been altered based on the change E(n−1) in the error rate of the track TR(n−1), an estimated maximum off-track amount OnOA in the outward direction in the sector SnA of the track TRn, an initially set target position FTGnB in a sector SnB of the track TRn, a target position STGn1B in the sector SnB of the track TRn, the target position STGn1B having been altered based on the change E(n−1) in the error rate of the track TR(n−1), and an estimated maximum off-track amount OnOB in the outward direction in the sector SnB of the track TRn. Hereinafter, the "initially set target position in a particular sector of a particular track" may be simply referred to as "initial target position". The "target position in a sector of a particular track, the target position having been altered based on the change in the error rate of a track located in the radial direction of the particular track" may be simply referred to as a "modified target position". Further, the "estimated maximum off-track amount in the outward direction in a particular sector of a particular track" may be simply referred to as a "maximum off-track amount in the outward direction".

In the example illustrated in FIG. 8, the initial target positions FTGnA and FTGnB are the same radial position and correspond to the track center TRCn of the track TRn. The modified target position STGn1A is located in the outward direction with respect to the initial target position FTGnA. The modified target position STGn1B is located in the inward direction with respect to the initial target position FTGnB. FIG. 8 illustrates the write head 15W off-tracking in the outward direction by the maximum off-track amount OnOA in the outward direction with respect to the modified target position STGn1A in the sector SnA, and the write head 15W off-tracking in the outward direction by the maximum off-track amount OnOB in the outward direction with respect to the modified target position STGn1B in the sector SnB. For example, the maximum off-track amount OnOA in the outward direction and the maximum off-track amount OnOB in the outward direction are the same value. Note that the maximum off-track amount OnOA in the outward direction and the maximum off-track amount OnOB in the outward direction may be different values from each other.

In the example illustrated in FIG. 8, in a case where data is written to the track TRn, the MPU 60 alters the initial target path FTGn of the track TRn to the modified target path STGn1 based on the change in the margin (the change E(n−1) in the error rate) corresponding to the track TR(n−1). For example, the MPU 60 alters the initial target position FTGnA to the modified target position STGn1A based on a margin M(n−1)A in the sector SnA. Further, the MPU 60 alters the initial target position FTGnB to the modified target position STGn1B based on a margin M(n−1)B in the sector SnB.

In the example illustrated in FIG. 8, the MPU 60 writes the track TRn based on the modified target path STGn1. The MPU 60 writes data based on the modified target position STGn1A in the sector SnA. There is a possibility that the MPU 60 off-tracks by the maximum off-track amount OnOA in the outward direction with respect to the modified target position STGn1A and writes data. Therefore, in the sector S(n−1)A of the track TR(n−1), the track width of the track TR(n−1) is equal to or larger than a track width Tw(n−1)A1. Further, a read/write controller 610 writes data based on the modified target position STGn1B in the sector SnB. There is a possibility that the MPU 60 off-tracks by the maximum off-track amount OnOB in the outward direction with respect to the modified target position STGn1B and writes data. Therefore, in a sector S(n−1)B of the track TR(n−1), a track width of the track TR(n−1) becomes a track width Tw(n−1)B1 (=Tw(n−1)). That is, the track width Tw(n−1)B1 of the track TR(n−1) becomes the track width Tw(n−1)A1 or more in the sector S(n−1)B of the track TR(n−1). Note that, in a case where data is written to the track TRn after data is written to a track located in the inward direction with respect to the track TRn, the write processing can be similarly executed to the case where the track TRn is written after the track TR(n−1) is written illustrated in FIG. 8.

Figure 9:
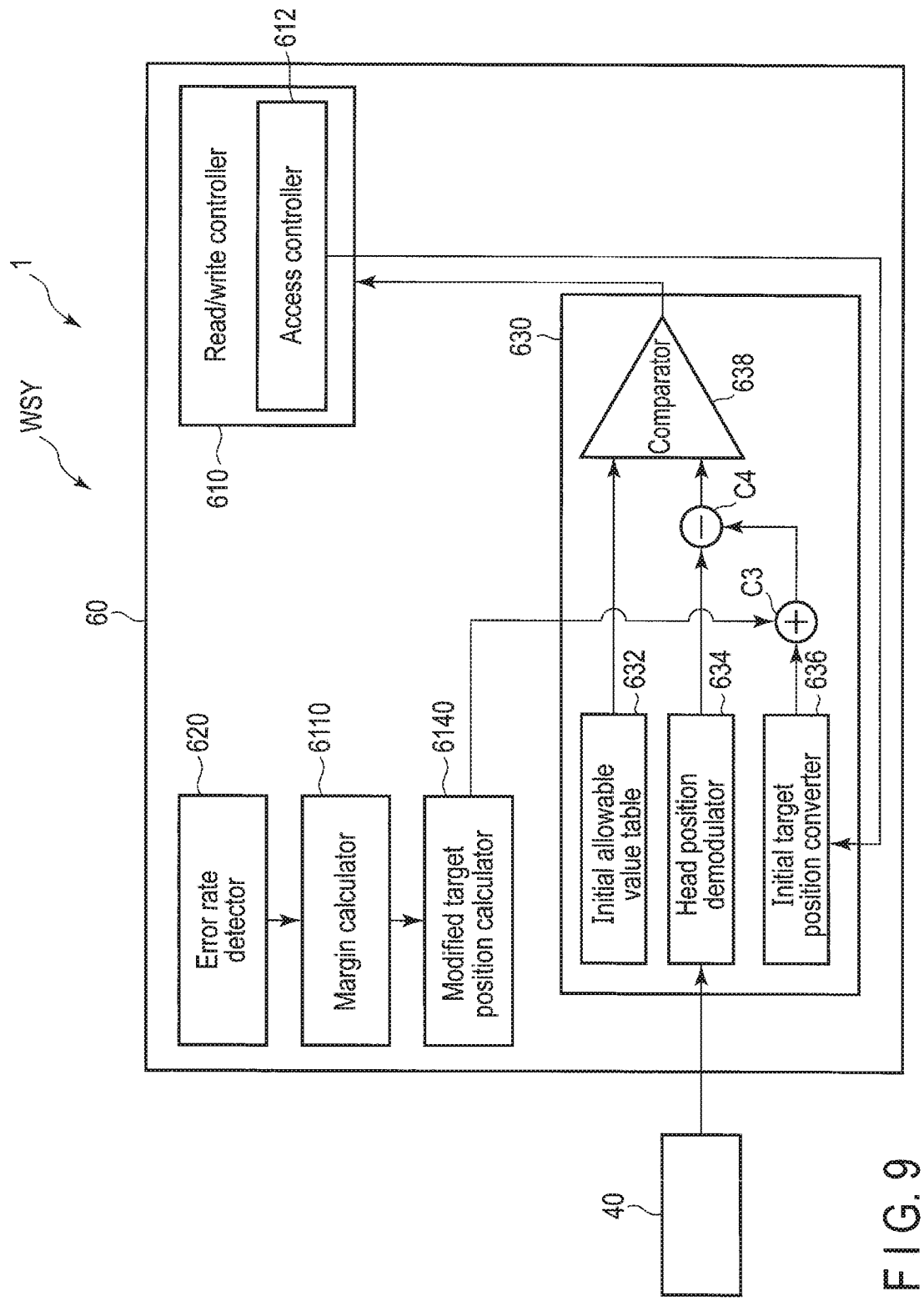
FIG. 9 is a block diagram illustrating an example of a write processing system according to the second modification.

FIG. 9 is a block diagram illustrating an example of a write processing system WSY according to the second modification.

The write processing system WSY includes the read/write controller 610, an error rate detector 620, a position controller 630, a modified target position calculator 6140, a calculation unit C3, and a calculation unit C4.

The modified target position calculator 6140 calculates a modification amount of the target position (hereinafter, the modification amount is referred to as a target position modification amount) based on the margin.

The margin calculator 6110 outputs the margin to the modified target position calculator 6140. The margin is input to the modified target position calculator 6140. The modified target position calculator 6140 outputs the target position modification amount to the calculation unit C3. The initial target position converter 636 outputs the initial target position to the calculation unit C3. The target position modification amount and the initial target position are input to the calculation unit C3. The calculation unit C3 outputs a modified target position obtained by adding the target position modification amount to the initial target position to the calculation unit C4. The head position demodulator 634 outputs an actual position to the calculation unit C4. The modified target position and the actual position are input to the calculation unit C4. The calculation unit C4 outputs a positioning error obtained by subtracting the modified target position from the actual position to a comparator 638. An initial allowable value table 632 outputs the initial allowable value to the comparator 638. The initial allowable value and the positioning error are input to the comparator 638. The comparator 638 compares the initial allowable value with the positioning error, and outputs a write allowance signal or a write prohibition signal to the read/write controller 610 according to the comparison result. For example, the comparator 638 outputs the write prohibition signal to the read/write controller 610 in a case where the positioning error is larger than the initial allowable value. Further, for example, the comparator 638 outputs the write allowance signal to the read/write controller 610 in a case where the positioning error is equal to or less than the initial allowable value.

FIG. 10 is a flowchart illustrating an example of a write processing method according to the second modification.

The MPU 60 detects the error rate of an adjacent track adjacent to a particular track (B401), and calculates the margin in the adjacent track based on the error rate of the adjacent track adjacent to the particular track and the error rate threshold value (B402). The MPU 60 alters the target position (target path) of the particular track based on the margin (change in the margin) corresponding to the adjacent track adjacent to the particular track (B1001). For example, the MPU 60 alters the target path of the particular track based on the change in the margin corresponding to the adjacent track adjacent to the particular track. In a case where the margin corresponding to an adjacent sector adjacent to a particular sector of a particular track is large, the MPU 60 shifts the target position of the particular sector to the side of the adjacent sector. In a case where the margin corresponding to the adjacent sector adjacent to a particular sector of a particular track is small, the MPU 60 shifts the target position of the particular sector to the opposite side to the adjacent sector. The MPU 60 executes the write processing for the particular track based on the modified target position (modified target path) (B1002) and terminates the processing. For example, the MPU 60 executes the write processing for the particular track based on the modified target path.

According to the second modification, the magnetic disk device 1 detects the error rate (change in the error rate) of an adjacent track adjacent to a particular track, calculates the margin (change in the margin) corresponding to the adjacent track based on the detected error rate (change in the error rate) of the adjacent track and the error rate threshold value, alters the target position (target path) of the particular track based on the margin (change in the margin) corresponding to the adjacent track, and writes data to the particular track based on the modified target position (modified target path). Therefore, the magnetic disk device 1 shifts the target position to the side of the adjacent track at a circumferential position where the margin of the adjacent track is large, and shifts the target position to the opposite side to the adjacent track at a circumferential position where the margin of the adjacent track is small. Therefore, an average interval of target position with respect to the adjacent track, that is, a track pitch can be narrowed down. Therefore, the magnetic disk device 1 can improve the data recording capacity.

Note that the magnetic disk device 1 of the second modification may alter the allowable value based on the margin, as described in the above embodiment.

(Third Modification)

A magnetic disk device 1 according to a third modification is different from the above-described second modification in writing a particular track having adjacent tracks on both sides in a radial direction.

Figure 11:
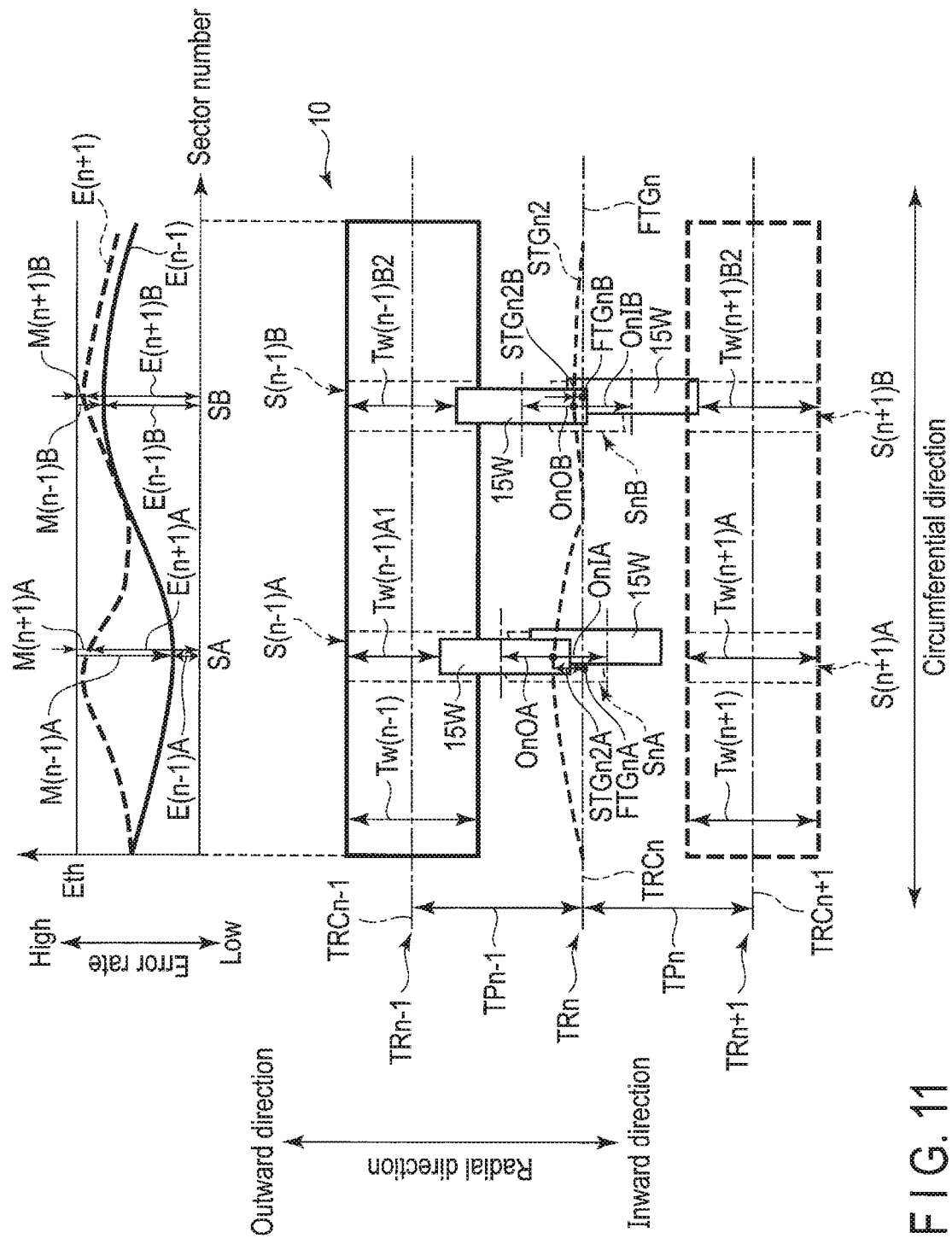
FIG. 11 is a diagram illustrating an example of write processing according to a third modification.

FIG. 11 is a diagram illustrating an example of write processing according to the third modification. FIG. 11 illustrates a diagram of an example of change E(n−1) in an on-track error rate with respect to each circumferential position of a track TR(n−1), and change E(n+1) in an on-track error rate with respect to each circumferential position of a track TR(n+1) in an upper row.

FIG. 11 further illustrates the track TR(n+1) adjacent in an inward direction to a track TRn. FIG. 11 illustrates a track center TRCn+1 of the track TR(n+1). In FIG. 11, the track TR(n+1) is written with the track center TRCn+1 as a target position. In FIG. 11, the track TR(n+1) linearly extends for convenience of description but in practice the track TR(n+1) is curved along the shape of a disk 10. Further, the track TR(n+1) may extend in a circumferential direction while varying in a wavy manner in a radial direction. The track TR(n+1) is written with a track width Tw(n+1). The track TR(n+1) includes a sector S(n+1)A adjacent in the inward direction to a sector SnA, and a sector S(n+1)B adjacent in the inward direction to a sector SnB and different from the sector S(n+1)A. Here, "A" of the sector S(n+1)A and "B" of the sector S(n+1)B indicate numbers of the sectors, respectively. In FIG. 11, the track TR(n−1) has a track width Tw(n−1)B2 in the sector S(n−1)B. The track width Tw(n−1)B2 is larger than the track width Tw(n−1)A1. The track TR(n+1) has the track width Tw(n+1)A in the sector S(n+1)A and has the track width Tw(n+1)B2 in the sector S(n+1)B. The track width Tw(n+1) is equivalent to, for example, the track width Tw(n−1). The track width Tw(n+1)A is equivalent to, for example, the track width Tw(n+1). The track width Tw(n+1)B2 is smaller than the track width Tw(n+1)A. The track widths Tw(n+1)A and Tw(n+1)B2 are larger than the track width Tw(n−1)A. The track width Tw(n+1)B2 is larger than the track width Tw(n−1)B2. FIG. 11 illustrates a modified target path STGn2. Further, FIG. 11 illustrates a track pitch TPn corresponding to an interval between the track center TRCn+1 of the track TR(n+1) and the track center TRCn of the track TRn.

FIG. 11 illustrates an on-track error rate E(n+1)A in the sector S(n+1)A corresponding to a sector number A of the track TR(n+1), and an on-track error rate E(n+1)B in the sector S(n+1)B corresponding to a sector number B of the track TR(n+1). In the example illustrated in FIG. 11, the on-track error rate E(n+1)A is lower than the on-track error rate E(n+1)B. The on-track error rate E(n+1)A is higher than the on-track error rates E(n−1)A and E(n−1)B. For example, the on-track error rate E(n+1)B is the highest error rate in the change E(n+1) in the error rate. The on-track error rate E(n+1)B is higher than the on-track error rates E(n−1)A and E(n−1)B. Further, FIG. 11 illustrates a margin M(n+1)A corresponding to a difference value between the on-track error rate E(n+1)A and an error rate threshold value Eth, and a margin M(n+1)B corresponding to a difference value between the on-track error rate E(n+1)B and the error rate threshold value Eth. In the example illustrated in FIG. 11, the margin M(n+1)A is larger than the margin M(n+1)B. That is, an off-track amount of a write head 15W in the inward direction in the sector SnA may be larger than an off-track amount of a write head 15W in the inward direction in the sector SnB.

FIG. 11 illustrates a predicted maximum off-track amount OnIA in the inward direction in the sector SnA of the track TRn and a predicted maximum off-track amount OnIB in the inward direction in the sector SnB of the track TRn. Hereinafter, the "estimated maximum off-track amount in the inward direction in a particular sector of a particular track" may be simply referred to as a "maximum off-track amount in the inward direction". The modified target position STGn2B is located in the outward direction with respect to the initial target position FTGnB. FIG. 11 illustrates the write head 15W off-tracking in the inward direction by the maximum off-track amount OnIA in the inward direction with respect to a modified target position STGn2A in the sector SnA, the write head 15W off-tracking in the outward direction by the maximum off-track amount OnOB in the outward direction with respect to the modified target position STGn2B in the sector SnB, and the write head 15W off-tracking in the outward direction by the maximum off-track amount OnIB in the inward direction with respect to the modified target position STGn2B in the sector SnB. For example, the maximum off-track amounts OnOA and OnOB in the outward direction and the maximum off-track amounts OnIA and OnIB in the inward direction are the same values. Note that the maximum off-track amounts OnOA and OnOB in the outward direction and the maximum off-track amounts OnIA and OnIB in the inward direction may be different values.

In the example illustrated in FIG. 11, in a case where data is written to the track TRn, an MPU 60 alters the initial target path FTGn of the track TRn to the modified target path STGn2B based on the change in the margin (change E(n−1) in the error rate) corresponding to the track TR(n−1), and change in the margin (change E(n+1) in the error rate) corresponding to the track TR(n+1). For example, the MPU 60 alters the initial target position FTGnA to the modified target position STGn2A based on a margin M(n−1)A and a margin M(n+1)A in the sector SnA. The MPU 60 compares the margin M(n−1)A and the margin M(n+1)A, and shifts the initial target position FTGnA to the side of the track TR(n−1) because the margin M(n−1)A is larger than the margin M(n+1)A. In other words, the MPU 60 compares the on-track error rate E(n−1)A and the on-track error rate E(n+1)A, and shifts the initial target position FTGnA to the side of the track TR(n−1) because the on-track error rate E(n−1)A is lower than the on-track error rate E(n+1)A. Further, the MPU 60 alters the initial target position FTGnB to the modified target position STGn2B based on the margins M(n−1)B and M(n+1)B in the sector SnB. The MPU 60 compares the margin M(n−1)B and the margin M(n+1)B, and slightly shifts the initial target position FTGnB to the side of the track TR(n−1) because the margin M(n−1)B is slightly larger than the margin M(n+1)B. In other words, the MPU 60 compares the on-track error rate E(n−1)B and the on-track error rate E(n+1)B, and shifts the initial target position FTGnB to the side of the track TR(n−1) because the on-track error rate E(n−1)B is slightly lower than the on-track error rate E(n+1)B.

In the example illustrated in FIG. 11, the MPU 60 writes the track TRn based on the modified target path STGn2. The MPU 60 writes data based on the modified target position STGn2A in the sector SnA. There is a possibility that the MPU 60 off-tracks by the maximum off-track amount OnOA in the outward direction with respect to the modified target position STGn2A and writes data. Further, there is a possibility that the MPU 60 off-tracks by the maximum off-track amount OnIA in the inward direction with respect to the modified target position STGn2A and writes data. Therefore, in the sector S(n−1)A of the track TR(n−1), the track width of the track TR(n−1) is equal to or larger than the track width Tw(n−1)A1. Further, in the sector S(n+1)A of the track TR(n+1), the track width Tw(n+1)A of the track TR(n+1) is equal or larger than the track width Tw(n−1)A1.

The MPU 60 writes data based on the modified target position STGn2B in the sector SnB. There is a possibility that the MPU 60 off-tracks by the maximum off-track amount OnOB in the outward direction with respect to the modified target position STGn2B and writes data. Further, there is a possibility that the MPU 60 off-tracks by the maximum off-track amount OnIB in the inward direction with respect to the modified target position STGn2B and writes data. Therefore, the track width Tw(n−1)B2 of the track TR(n−1) becomes the track width Tw(n−1)A1 or more in the sector S(n−1)B of the track TR(n−1). Further, the track width Tw(n+1)B2 of the track TR(n+1) becomes the track width Tw(n−1)B2 or more in the sector S(n+1)B of the track TR(n+1).

FIG. 12 is a flowchart illustrating an example of a write processing method according to the third modification.

The MPU 60 detects the error rate of the adjacent track adjacent in the outward direction to a particular track (B1201). The MPU 60 calculates the margin corresponding to the adjacent track adjacent in the outward direction to the particular track (B1202). The MPU 60 detects the error rate of the adjacent track adjacent in the inward direction to the particular track (B1203). The MPU 60 calculates the margin corresponding to the adjacent track adjacent in the inward direction to the particular track (B1204). The MPU 60 alters the target position of the particular track based on the margin corresponding to the adjacent track adjacent in the outward direction to the particular track and the margin corresponding to the adjacent track in the inward direction to the particular track (B1205). The MPU 60 executes the write processing for the particular track based on the modified target position (B1206) and terminates the processing.

According to the third modification, the magnetic disk device 1 detects the error rate (change in the error rate) of an adjacent track adjacent to a particular track, calculates the margin (change in the margin) corresponding to the adjacent track based on the detected error rate (change in the error rate) of the adjacent track and the error rate threshold value, alters the target position (target path) of the particular track based on the margin (change in the margin) corresponding to the adjacent track, and writes data to the particular track based on the modified target position (modified target path). Therefore, the magnetic disk device 1 shifts the target position to the side of the adjacent track having a larger margin between the two adjacent tracks adjacent in the radial direction. Therefore, the magnetic disk device 1 can improve the reliability of data.

Note that the configurations in the above-described embodiment and modifications can be applied not only to the magnetic disk device 1 that writes data by normal recording but also a magnetic disk device that writes data by shingled write recording.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head configured to write data to the disk and read data from the disk; and
   a controller configured to control the head to write a first track based on a first error rate read immediately after writing a second track adjacent in a radial direction of the disk to the first track, wherein
   the controller controls the head position to write the first track based on a first difference value between the first error rate and a maximum error rate at which the data written in the disk is readable.

2. The magnetic disk device according to claim 1, wherein the controller alters a first upper limit value which allows offset write to a side of the second track while writing the first track, based on the first difference value.

3. The magnetic disk device according to claim 2, wherein, in a case where a second difference value corresponding to a first sector in the first difference value in the first track is larger than a third difference value corresponding to a second sector different from the first sector in the first difference value in the first track, the controller makes a second upper limit value corresponding to the first sector in the first upper limit value larger than a third upper limit value corresponding to the second sector in the first upper limit value.

4. The magnetic disk device according to claim 1, wherein the controller alters a first target position in the radial direction of when writing the first track based on the first difference value.

5. The magnetic disk device according to claim 4, wherein, in a case where a second difference value corresponding to a first sector in the first difference value in the first track is larger than a third difference value corresponding to a second sector different from the first sector in the first difference value in the first track, the controller arranges a second target position corresponding to the first sector in the first target position on a side of the first track with respect to a third target position corresponding to the second sector in the first target position.

6. The magnetic disk device according to claim 1, wherein the controller controls the head to write the first track based on the first error rate and a second error rate read immediately after writing a third track adjacent to the first track on an opposite side to the second track in the radial direction of the disk.

7. The magnetic disk device according to claim 6, wherein the controller controls the head to write the first track based on a first difference value between the first error rate and a maximum error rate at which the data written in the disk is readable, and a second difference value between the second error rate and the maximum error rate.

8. The magnetic disk device according to claim 7, wherein, in a case where a second difference value corresponding to a first sector of the first track in the first difference value is larger than a third difference value corresponding to the first sector in the second difference value, the controller shifts a first target position corresponding to the first sector to a side of the first track.

9. A magnetic disk device comprising:
a disk;
a head configured to write data to the disk and read data from the disk; and
a controller configured, when writing a first track after writing a second track adjacent to the first track in a radial direction of the disk, to make a first upper limit value of offset to the second track side in the radial direction upon writing a first sector of the first track greater than a second upper limit value of offset to the second track side in the radial direction upon writing a second sector of the first track different from the first sector, based on a first error rate read immediately after writing the second track.

10. The magnetic disk device according to claim 9, wherein, in a case where a first difference value between a second error rate corresponding to the first sector in the first error rate and a maximum error rate at which the data written in the disk is readable is larger than a second difference value between a third error rate corresponding to the second sector in the first error rate and the maximum error rate, the controller makes the first upper limit value larger than the second upper limit value.

11. A write processing method to be applied to a magnetic disk device including a disk and a head configured to write data to the disk and read data from the disk, the method comprising:
controlling the head to write a first track based on a first error rate read immediately after writing a second track adjacent in a radial direction of the disk of the first track, and
controlling the head position to write the first track based on a first difference value between the first error rate and a maximum error rate at which the data written in the disk is readable.

12. The write processing method according to claim 11, the method comprising: altering a first upper limit value which allows offset write to a side of the second track while writing the first track, based on the first difference value.

13. The write processing method according to claim 12, the method comprising: in a case where a second difference value corresponding to a first sector in the first difference value in the first track is larger than a third difference value corresponding to a second sector different from the first sector in the first difference value in the first track, making a second upper limit value corresponding to the first sector in the first upper limit value larger than a third upper limit value corresponding to the second sector in the first upper limit value.

14. The write processing method according to claim 11, the method comprising: altering a first target position in the radial direction when writing the first track based on the first difference value.

15. The write processing method according to claim 14, the method comprising: in a case where a second difference value corresponding to a first sector in the first difference value in the first track is larger than a third difference value corresponding to a second sector different from the first sector in the first difference value in the first track, arranging a second target position corresponding to the first sector in the first target position on a side of the first track with respect to a third target position corresponding to the second sector in the first target position.

16. The write processing method according to claim 11, the method comprising: controlling the head to write the first track based on the first error rate and a second error rate read immediately after writing a third track adjacent to the first track on an opposite side to the second track in the radial direction of the disk.

17. The write processing method according to claim 16, the method comprising: controlling the head to write the first track based on a first difference value between the first error rate and a maximum error rate at which the data written in the disk is readable, and a second difference value between the second error rate and the maximum error rate.

18. The write processing method according to claim 17, the method comprising: in a case where the second difference value corresponding to a first sector of the first track in the first difference value is larger than a third difference value corresponding to the first sector in the second difference value, shifting a first target position corresponding to the first sector to a side of the first track.

* * * * *